Figure 1:
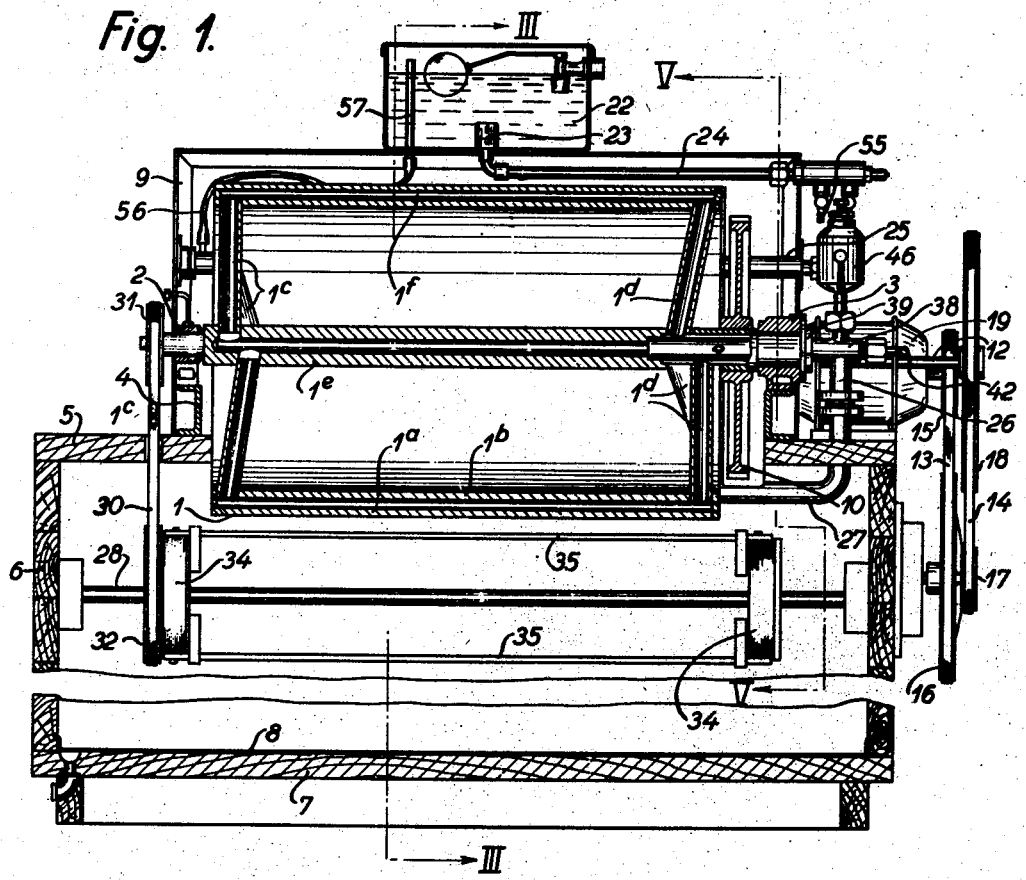

April 19, 1949.  A. GRUHN  2,467,933
MACHINE FOR MAKING ARTIFICIAL ICE PRODUCTS
Filed Jan. 7, 1941  4 Sheets-Sheet 1

INVENTOR
A. Gruhn
By *[signature]*
ATTORNEY

April 19, 1949.  A. GRUHN  2,467,933
MACHINE FOR MAKING ARTIFICIAL ICE PRODUCTS
Filed Jan. 7, 1941  4 Sheets-Sheet 2
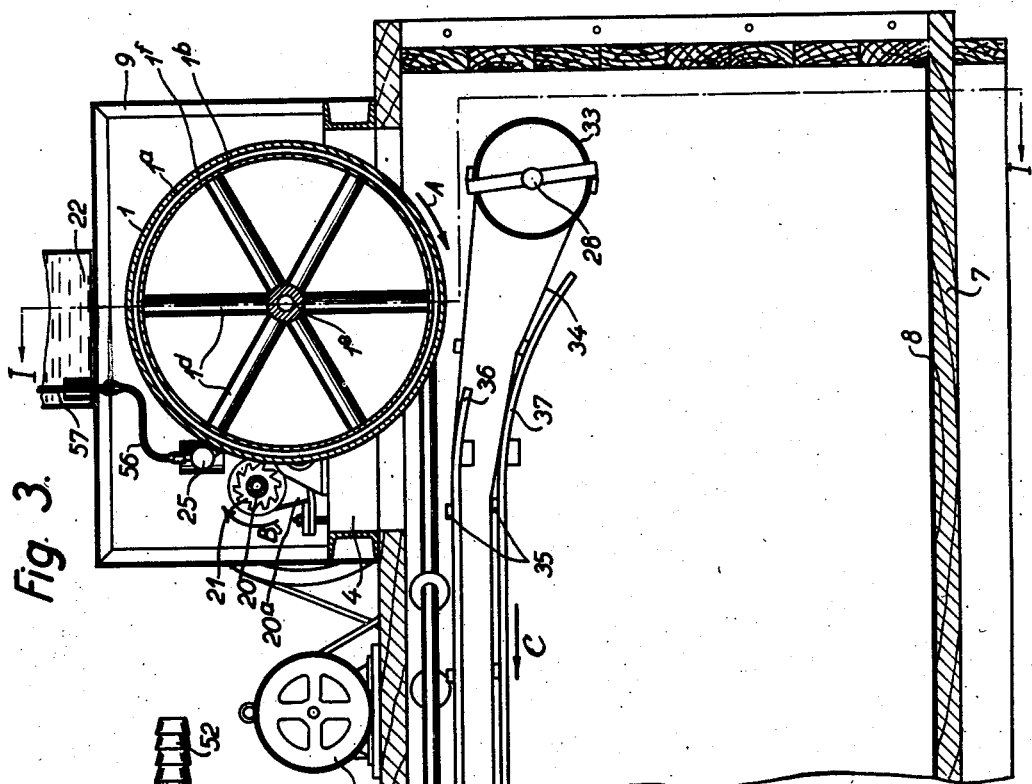
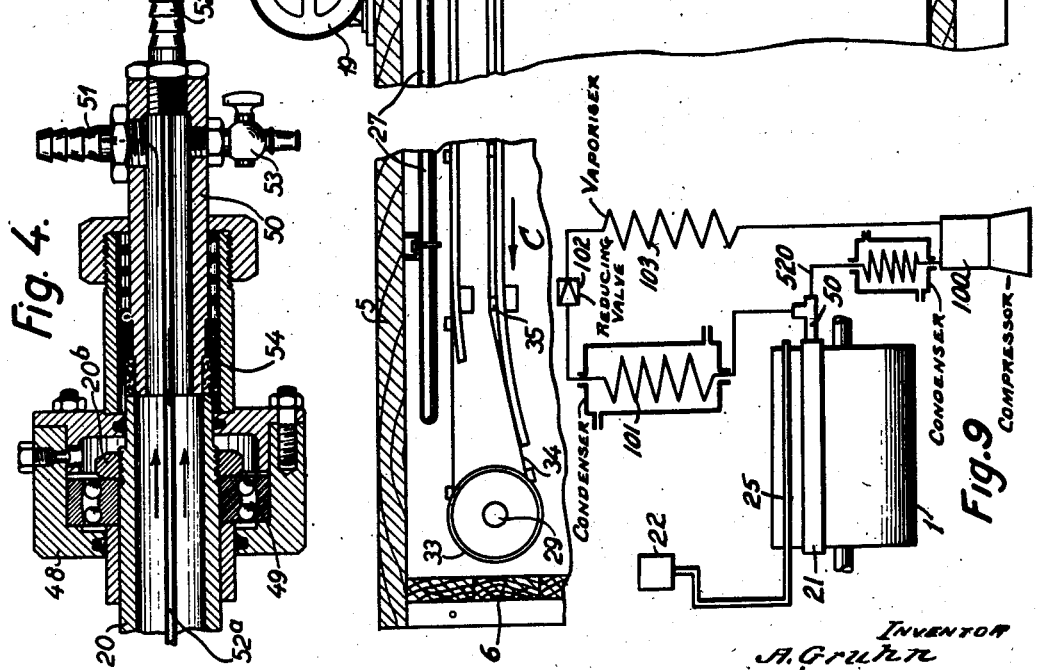

April 19, 1949.  A. GRUHN  2,467,933
MACHINE FOR MAKING ARTIFICIAL ICE PRODUCTS
Filed Jan. 7, 1941  4 Sheets-Sheet 3

INVENTOR
A. Gruhn
BY
E. F. Onsworth
ATTORNEY

April 19, 1949. A. GRUHN 2,467,933
MACHINE FOR MAKING ARTIFICIAL ICE PRODUCTS
Filed Jan. 7, 1941 4 Sheets-Sheet 4

INVENTOR
A. Gruhn
By
ATTORNEY

Patented Apr. 19, 1949

2,467,933

UNITED STATES PATENT OFFICE 2,467,933

MACHINE FOR MAKING ARTIFICIAL
ICE PRODUCTS

Axel Gruhn, Skaade Bakker, near Hojbjerg, Denmark; vested in the Attorney General of the United States Application January 7, 1941, Serial No. 373,486
In Denmark March 9, 1940

Section 3, Public Law 690, August 8, 1946
Patent expires March 9, 1960

11 Claims. (Cl. 62—105)

The present invention relates to methods and machines for making a new artificial ice product to be used primarily, but not exclusively for cooling purposes.

It is previously known to continuously produce ice on the cold surface of a rotatable thin-walled elastic freezing drum submerged in a water bath, from which the congealed material is removed by a violent breaking action forming shell-ice.

Furthermore it is known to supply a large excess of liquid to the external surface or the internal surface of a rotating or stationary freezing drum or similar body to produce slush-ice which is scraped off and swept away with the liquid or dropped upon a screen to drain off some of the excess liquid.

However, shell-ice is not satisfactory for the ice-packing of various goods because the sharp edges may injure the goods. Thus for instance fish are damaged when packing fresh fish with such ice. Slush-ice is wet and plastic, and even if in some cases it is bricketted by a comparatively expensive process its range of utility is much restricted. Moreover, slush-ice is unsatisfactory as its cooling power is reduced due to its water content.

The present invention has for its object to produce an artificial ice product of a special character more suitable for various uses. This is accomplished by a new method wherein a liquid to be congealed is supplied to a freezing surface and the ice formed thereon is removed in a finely divided state. The amount of liquid delivered per unit of time to the freezing surface, the temperature of the freezing surface and the interval of time from the supplying of the liquid until the removal of the ice being so adjusted relative to each other as to form hard, dry ice which in this state is removed by consecutive cutting actions, such as by means of a powerful milling cutter, to form thin cuttings or chips. These small cuttings look like scales of a fish, large flakes of snow or may even be smaller.

With regard to the difference between the freezing point of the liquid in question and the temperature of the freezing surface this depends upon various factors, such as the nature, the actual temperature and the freezing point of the liquid supplied, the period of time between the delivery of each liquid particle and the milling off of the ice and so on. For these reasons such difference can not be indicated generally, but it can easily be found experimentally in each particular case and must be so great that the ice besides being frozen uniformly throughout becomes very hard, so that by means of a powerful milling cutter an ice product of the desired character can be formed. However, by way of example in congealing fresh water the temperature of the freezing surface as a rule should not be higher than $-8$ to $-10°$ C., preferably between $-15$ and $-20°$ C., depending upon the designed capacity of the ice making machine.

The artificial ice produced according to the invention has the character of frost-snow with large, thin, scale-like crystals or finely divided ice, dry and without sharp edges that could hurt the goods with which the ice comes into contact. This new artificial ice is much more lively and more easily movable than the known ice products referred to above. It can be better distributed over the goods, such as milk bottles, vegetables, flowers, etc. When used for cooling mixtures the necessary salt can more easily be distributed uniformly throughout the mass of ice.

The invention can be applied not only to the freezing of pure water, but also to aqueous solutions of various salts, such as eutectic solutions for producing eutectic ice and liquids containing antiseptic or other substances assisting in keeping food articles fresh when cooled with such ice. Besides the present method can be used for congealing milk or other fluids which must be frozen in such a way, i. e. very rapid, so that the material during the freezing process is not divided into its various components.

In the case of the freezing surface forming the external surface of a rotatable cooling drum the latter may be partly submerged into a bath of the liquid to be congealed, or the liquid may be delivered to the freezing surface through nozzles, atomizers, perforated or finely slotted tubes or in any appropriate manner permitting a regulation of the amount of liquid delivered to the freezing surface per unit of time.

A further object of the invention is to provide a machine for carrying out the method having one or more revolvable milling cutters capable of cutting the hard and dry ice formed on the freezing surface into thin chips or cuttings. The milling cutter or cutters preferably are associated with heating means serving to maintain the same at a temperature equal to or above the freezing point of the liquid in order that the ice particles may readily leave the cutter as otherwise it would be clogged and its capacity reduced with consequent stopping or damage to the machine. For this purpose the milling cutter may be formed with a cavity through which the liquid to be congealed is passed whereby the liquid is simultaneously precooled. Alternatively as heating medium may be used the comparatively warm liquid refrigerant of a compression refrigerating plant cooperating with the ice making machine for cooling its freezing surface.

The character of the ice product may be varied within certain limits by controlling the speed of rotation of the milling cutter, by changing its direction of rotation relative to the motion of the freezing surface or by using milling cutters of various constructions. Thus a cylindrical milling cutter with straight or spiral grooves will give scale-like ice particles, whereas a cutter having cutting teeth arranged as one or more threads will make a more finely divided product. The milling-cutter is so adjusted as to leave a thin ice layer on the freezing surface, thereby protecting the latter.

The freezing surface may be the external or internal circumferential surface of a rotatable or stationary body of revolution, for instance similar to the well known cooling drums, or it may be plane. In such case the freezing surface is stationary whereas the liquid supplying means and the milling cutter or cutters are moved to and fro over the freezing surface, preferably with the milling cutter traveling in advance of the liquid supplying means and removing the ice formed. The cutter performs its return stroke or idle stroke in a path spaced from the freezing surface.

On the drawing two embodiments of ice making machines in accordance with the invention are shown.

Figure 2:
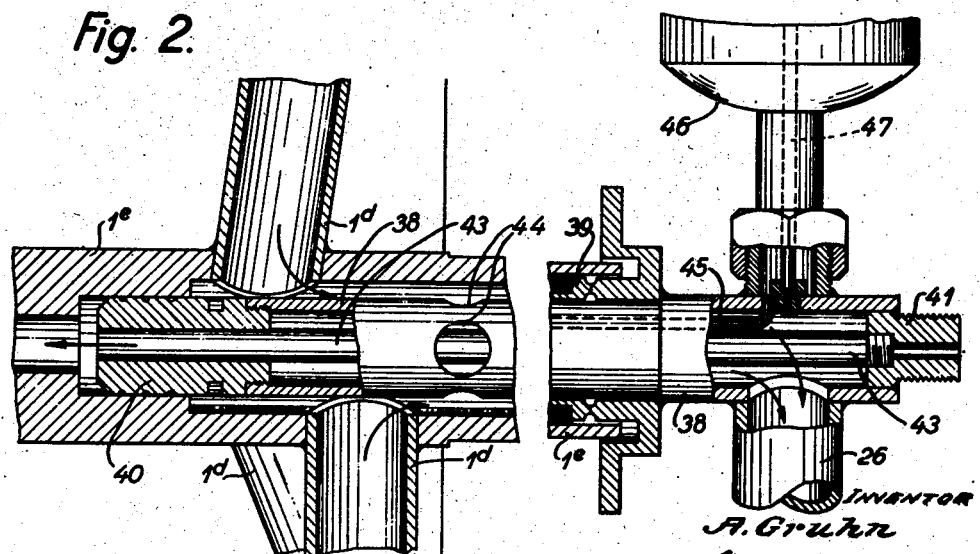
Figure 5:
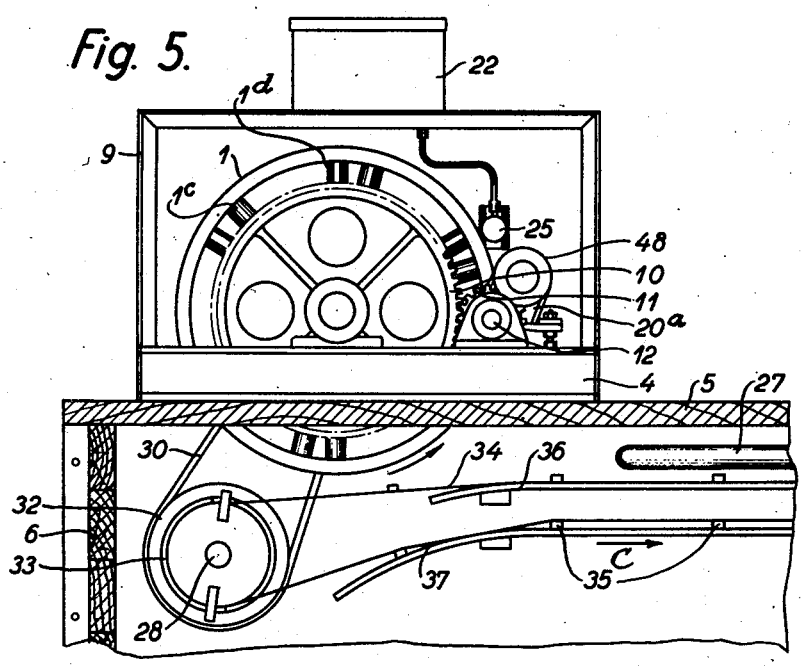
Figure 6:
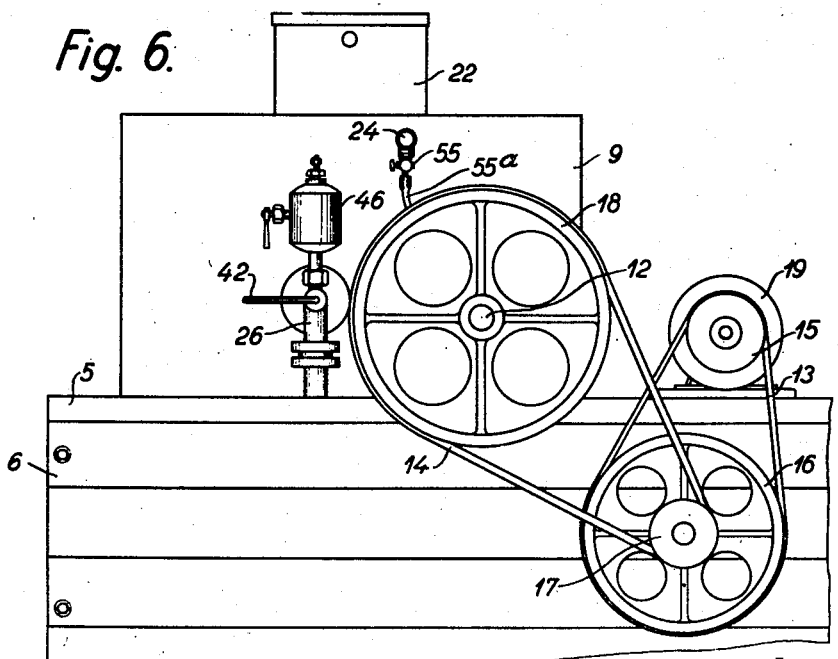
Figures 7, 8:
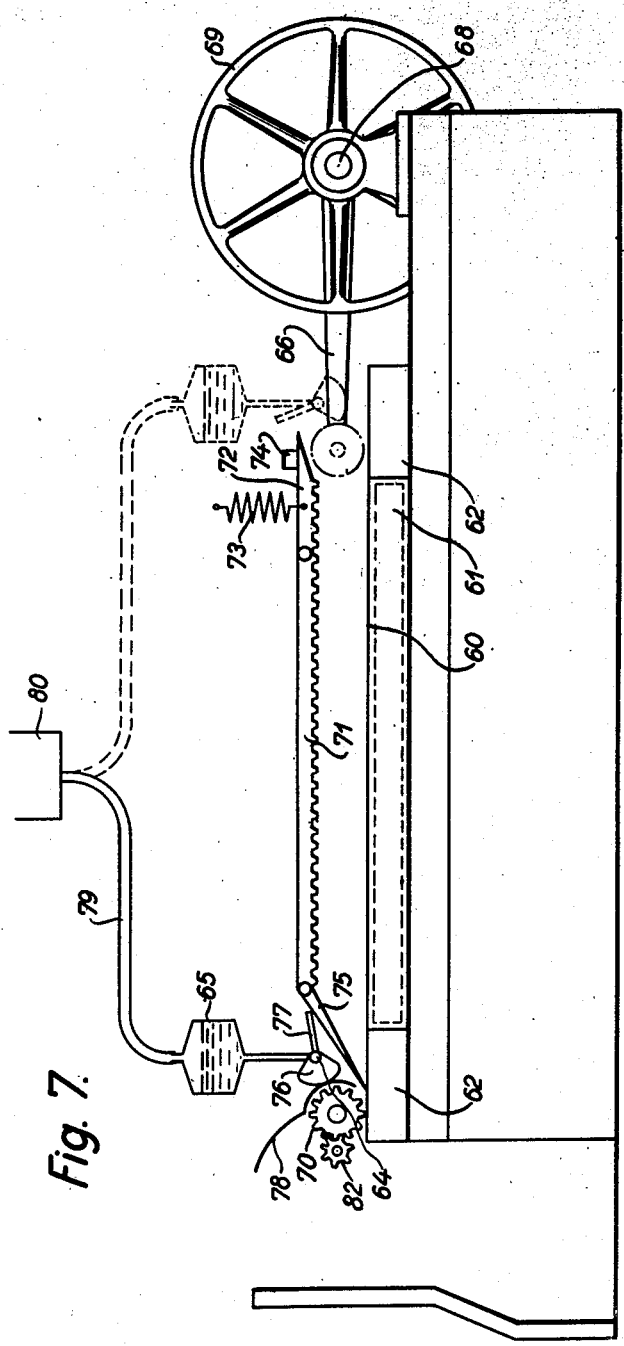

Fig. 1 shows a vertical cross-section along the section line I—I of Fig. 3 of one embodiment, Fig. 2 is a longitudinal section on a larger scale of one end of the hollow shaft of the freezing drum with associated parts, Fig. 3 is a longitudinal vertical section of the same machine along the line III—III of Fig. 1, Fig. 4 is a longitudinal section on a larger scale of one end of the hollow shaft of the milling cutter of the machine, Fig. 5 is a vertical cross-section of the upper part of the machine taken on the section line V—V of Fig. 1, Fig. 6 is a side elevation of one upper corner of the machine seen from the right side of Fig. 1, Fig. 7 shows somewhat diagrammatically an elevation of a second embodiment of the ice making machine, Fig. 8 shows a top view of the same, and Fig. 9 shows a diagrammatic view of the system with the arrangement for heating the cutter.

Figs. 1–6 show one form of an ice making machine wherein the freezing surface 1 is the external cylindrical surface of a rotatable double-walled drum consisting of an outer shell 1ᵃ and an inner shell 1ᵇ both carried by hollow spokes 1ᶜ and 1ᵈ on a hollow shaft 1ᵉ journalled in bearings 2 and 3. Between the two co-axial cylindrical shells 1ᵃ and 1ᵇ a narrow annular cooling chamber 1ᶠ is formed.

The bearings 2 and 3 are mounted on a rigid metal frame 4 carried by the top wall 5 of a large and long wooden tank 6 adapted to receive the scale-ice produced. The bottom wall 7 of the tank is covered by a thin metal plate 8.

The freezing drum with associated parts are housed within a sheet metal casing 9 arranged on the top of the wooden tank 6. On the hollow shaft 1ᵉ of the freezing drum a gear wheel 10 is secured which meshes with a pinion 11 on a shaft 12. The shaft 12 is driven by the belts 13 and 14 and pulleys 15, 16, 17 and 18, Figs. 1 and 6, from an electric motor 19 mounted on the top wall 5 of the tank 6. The freezing drum is rotated thereby comparatively slowly in the direction of the arrow A in Fig. 3.

The shaft 12 also carries a gear meshing with a second gear secured on a hollow shaft 20 carrying a cylindrical grooved milling cutter 21 which is revolved rapidly in the direction of the arrow B shown in Fig. 3. The milling cutter has a length equal to that of the freezing drum, and its axis of rotation as shown in Fig. 3 is slightly above the level of the shaft of the drum. The hollow shaft 20 of the milling cutter is journalled in bearings carried by brackets 20ᵃ, Figs. 3 and 5, which are rigidly secured to the metal frame 4.

The liquid to be congealed is supplied from the bottom of a container 22 through a strainer 23, Fig. 1, a pipe 24 and other connections described below to the right hand end of a jet pipe or nozzle member 25 placed parallel to the axis of the freezing drum and slightly above the milling cutter 21 as shown in Fig. 3. The jet pipe or nozzle member 25 spreads the liquid in fine jets or sprays over the entire length of the freezing surface 1.

In operation a refrigerating medium, such as liquid ammonia, is supplied to the right hand end, Fig. 1, of the hollow shaft 1ᵉ of the freezing drum, from which it flows through the hollow spokes 1ᶜ to the narrow cooling chamber 1ᶠ where the liquid is evaporated thereby cooling the drum. The refrigerant gas flows through the hollow spokes 1ᵈ at the opposite end of the freezing drum to a refrigerant gas pipe 26 preferably continued as a cooling coil 27 which is suspended from the top wall 5 of the wooden tank 6 as clearly shown in Figs. 3 and 5 to prevent thawing of the scale-ice accumulated in the tank.

When the freezing drum is rotated and liquid is spread over the same the liquid will be congealed and form a film or layer of hard dry ice of such thickness that part thereof can be removed by the rapidly revolving cutter 21 which in the present case is assumed to have straight parallel cutting edges. As the milling cutter is angularly spaced more than 300° from the jet pipe or nozzle member 25 in the direction of rotation of the drum and the liquid is supplied in a moderate quantity only the liquid gets sufficient time to be frozen uniformly throughout to form a very hard, dry layer of ice. Another factor important in obtaining this result is that the particular construction of the freezing drum ensures that all of the refrigerating medium is forcibly passed through the narrow annular cooling chamber 1ᶠ and thereby kept in close contact with the outer shell 1ᵃ of the drum. The thin ice scale or chips cut off by milling cutter 21 are thrown into the wooden tank 6 where they are collected. The dry ice appearing as frost snow may be removed through a door not shown, preferably placed at the left end of the wooden tank, Fig. 3, in one of the longitudinal walls thereof. The cooling coil 27 prevents thawing of the accumulated ice.

The machine is provided with a conveying device to distribute the ice throughout the entire length of the wooden tank. At each end of the tank near the top thereof there is rotatably mounted shafts 28 and 29. The shaft 28 is driven by a belt 30 and pulleys 31 and 32 from the shaft 1ᵉ of the freezing drum. Each of the shafts 28 and 29 carries two widely spaced pulleys 33 over which two equally spaced belts 34 run. These belts are interconnected by a series of transversely arranged sticks or bars 35 which travel in the direction of the arrows C shown in Figs. 3 and 5. The ends of the stick slide on and are supported by upper and lower stationary guide rails 36 and 37 which have downwardly curved ends as shown.

When the heap of scale ice accumulated in the wooden tank below the milling cutter becomes too high the top of the heap is moved away by the sticks 35 towards the left end of the tank Fig. 3 uniformly distributing the ice over the bottom thereof.

Some further details of the machine will now be explained with reference to Figs. 2 and 4.

Fig. 2 shows part of the hollow shaft 1ᵉ of the freezing drum at the refrigerant inlet and outlet end thereof. A stationary tube 38 rigidly secured to the refrigerant gas pipe 26 projects into the open end of the rotating shaft 1ᵉ and is sealed thereagainst by a stuffing box 29 of any standard type. The inner end of the tube 38 is screwed onto a plug 40 sealed against the inner cylindrical wall of the shaft 1ᵉ whereas the outer end of the tube is connected to a plug 41 connected with a liquid ammonia supply pipe 42, Fig. 1. The plug 41 is also connected to a thin pipe 43 which passes through the interior of the tube 38 and is connected at its other end in the plug 40. Through this pipe 43 the liquid refrigerant flows into the hollow middle portion of the shaft 1ᵉ, whereas the refrigerant gas coming from the hollow spokes 1ᵈ flows through apertures 44 into the tube member 38 and thence away through the pipe 26 as indicated by the arrows.

For sealing purposes oil is supplied to the interior of the stuffing box 39 through a small pipe 45 from an oil receptacle 46. Through a vertical pipe 47 refrigerant gas has access to a space above the oil level in the receptacle 46 whereby an oil pressure is established in the stuffing box which is slightly higher than that of the refrigerant gas to prevent escape of the same to the outer atmosphere.

One end of the hollow shaft 20 of the milling cutter 21 is closed while the other end shown in Fig. 4 is open and supported in a housing 48 having a ball bearing 49 with lock nuts 20ᵇ for this end of the shaft. The opposite end of the shaft is journalled in a similar ball bearing. A stationary tube 50 provided with two hose spigots 51 and 52 and a draining cock 53 is sealed against the end of the rapidly revolving shaft 20 by a stuffing box 54. The liquid to be congealed flows from the pipe 24, Fig. 1, through a cock 55 and a rubber hose 55ᵃ, Fig. 6, to the central spigot 52 of the tube 50 in Fig. 4, wherefrom the liquid is conducted through a small pipe 52ᵃ to the opposite end of the cutter shaft 20 where the liquid reverses and returns through the hollow shaft 20 and the tube 50 to the laterally disposed spigot 51. From this spigot the liquid through a second rubber hose not shown is passed to the right hand end of the jet pipe 25, Fig. 1, as indicated above. The opposite end of this jet pipe is vented by means of a rubber hose 56 and a small vertical pipe 57 carrying any air given off by the liquid into the space above the liquid level in the container 22.

By thus passing the liquid to be congealed through the hollow shaft 20 as above described the liquid is precooled before being sprayed onto the freezing surface 1, but the shaft and the milling cutter 21 are heated and thus maintained at a temperature equal to or slightly higher than the freezing point of the liquid so that clogging of the cutting edges of the milling cutter by ice particles is prevented and the continued effective operation of the cutter ensured.

In the embodiment of the machine described the ice is simultaneously removed throughout the entire width of the freezing surface by means of the milling cutter 21. However, a short revolving milling cutter may be used which is reciprocated. Also, particularly in the case of larger drums, a plurality of milling cutters may be used. As above stated the character of the removed ice may be varied by altering the construction or the mode of operation of the cutter or cutters.

As a dry thin film of ice is left on the rotating freezing surface after passing the milling cutters it may be advantageous to even out the liquid supplied to the freezing surface by means of a smooth roller or strip, for instance of rubber, not shown, bearing against the drum shortly beyond the jet pipe 25.

Figs. 7 and 8 show somewhat diagrammatically an embodiment of an ice making machine having a stationary plane freezing surface and a movable milling cutter and liquid supplying device. The freezing surface 60 is the horizontal uppermost surface of a flat hollow cooling box 61 cooled in any appropriate manner. This box has extensions 62 serving as supports for the milling cutter 63 and the liquid supplying device 64 when these occupy positions outside the freezing surface. The milling cutter 63 and the liquid supplying device 64 as well as a container 65 feeding the same are all carried by a common slide or bracket not shown fixing their mutual distances and moved to and fro together with them. This unit is reciprocated in the longitudinal direction of the machine by means of cranks 66 and connecting rods 67. The said cranks are secured on a crank shaft 68 carrying a belt pulley 69 driven in a suitable manner.

During the working stroke, i. e. while travelling from the right to the left, the milling cutter 63 is rapidly rotated around its own axis by means of the gear wheel mechanism shown at the left end of Fig. 8. This mechanism includes a pair of pinions 70 loosely mounted on the shaft of the milling cutter and meshing with a pair of stationary racks 71. At the end adjacent to the crank shaft 68 the racks are provided with pivoted links 72 normally held in horizontal position by a spring 73 against a stop 74. At the opposite end two pivoted links 75 likewise are provided which need not be provided with springs as these links are held by gravity in engagement with the extensions 62 of the freezing surface.

During the reciprocation of the milling cutter 63 it will alternately run above the racks in a direction towards the crank shaft 68 and below the racks in the opposite direction. This latter stroke constitutes the working stroke during which removal of the ice and delivery of liquid take place, whereas the return stroke is an idle stroke. In order to ensure that liquid is only supplied to the freezing surface during the working stroke the liquid supplying device 64, such as a jet pipe or nozzle member, is provided with an interior sleeve valve which is kept closed by counterweights 76 when these are turned downward, whereas the sleeve valve is opened by levers 77 rigidly secured to the counterweights and said valve when these levers engage the pivoted links 72 when beginning the working stroke. During this stroke the sleeve valve is held open until the levers leave the racks 71 whereby the liquid supply is automatically cut off. 78 is a screen preventing the ice particles from being hurled around by the milling cutter.

As stated above the liquid supplying device 64 is fed with liquid from a container 65. This container by means of a flexible hose 79 is connected with a stationary tank 80 or a liquid supply conduit.

During the working stroke liquid is supplied to the freezing surface a short distance behind the revolving cutter 63. The liquid is congealed to a uniformly frozen, dry, hard ice layer from which the ice is removed in the form of thin scales or chips as in the embodiment shown in Figs. 1–6.

During the idle stroke of the milling cutter and liquid supplying device a pair of smooth rollers 81 run on the upper surface of the links 75, the racks 71 and the links 72, until the milling cutter and said device arrive at the positions shown in dotted lines at the right end of Fig. 7. Then the working stroke commences.

The pinions 70 loosely mounted on the shaft of the milling cutter 63 mesh with small gears 82 on the shafts of which larger gears 83 are secured which in turn engage gears 84 rigidly secured to the shaft of the milling cutter. The latter shaft as well as the shafts of all these gear wheels are mounted in the slide bracket referred to above, which also carries the container 65 with the liquid supplying device 64.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. In an ice making machine in combination, a cooling body having a freezing surface, means for cooling said surface, means for delivering liquid to said surface, said cooling means being capable of cooling said surface to a sufficiently low temperature to thoroughly congeal said liquid to form a layer of hard dry undercooled ice on said surface, a revolvable milling cutter co-operable with said surface to remove congealed material therefrom, said cooling body and said milling cutter being relatively movable in addition to the rotation of the latter, and means for heating said milling cutter to facilitate removal of any particles therefrom.

2. In an ice making machine in combination, a cooling body having a freezing surface, means for cooling said surface, means for delivering liquid to said surface, said cooling means being capable of cooling said surface to a sufficiently low temperature to thoroughly congeal said liquid to form a layer of hard dry ice on said surface, a revolvable milling cutter co-operable with said surface to remove congealed material therefrom, said cooling body and said milling cutter being relatively movable in addition to the rotation of the latter, said milling cutter having a cavity, and means for circulating a comparatively warm fluid through said cavity.

3. In an ice making machine in combination, a stationary cooling body having a plane freezing surface, means for cooling said surface, means for gradually delivering liquid to said surface from one end thereof to the other, said cooling means being capable of cooling said surface to a sufficiently low temperature to thoroughly congeal said liquid to form a layer of hard dry ice on said surface, a revolvable milling cutter co-operable with said surface to remove congealed material therefrom in the form of dry thin scale or cuttings, and means for bodily moving said revolvable milling cutter along said plane freezing surface.

4. In an ice making machine in combination, a stationary cooling body having a plane freezing surface, means for cooling said surface, means for gradually delivering liquid to said surface from one end thereof to the other, said cooling means being capable of cooling said surface to a sufficiently low temperature to thoroughly congeal said liquid to form a layer of hard dry ice on said surface, a revolvable milling cutter co-operable with said surface to remove congealed material therefrom, and means for bodily moving said revolvable milling cutter in one direction along said plane freezing surface while milling off ice therefrom and for bodily returning said milling cutter in the opposite direction while spaced from said freezing surface.

5. In an ice making machine in combination, a rotatable cooling drum having an external freezing surface and an internal chamber for receiving a refrigerating medium, means for delivering liquid to said freezing surface, a revolvable milling cutter co-operable with said freezing surface at a line where the material congealed on said freezing surface forms a thoroughly dry hard undercooled ice layer, so that the milling cutter will remove the ice in the form of dry, thin scale or cuttings, and means for heating said milling cutter to release said ice scale or cuttings.

6. In an ice making machine in combination, a rotatable cooling drum having an external freezing surface and an internal chamber for receiving a refrigerating medium, means for delivering liquid to said freezing surface, a revolvable milling cutter co-operable with said freezing surface to cut ice therefrom in a finely divided state, said milling cutter having a cavity, and means for circulating a comparatively warm fluid through said cavity.

7. In an ice making machine in combination, a rotatable cooling drum having an external freezing surface and an internal chamber for receiving a refrigerating medium, means for delivering liquid to said freezing surface, a revolvable milling cutter co-operable with said freezing surface to cut ice therefrom in a finely divided state, said milling cutter having a cavity, and means for passing said liquid through said cavity before the liquid is delivered to the freezing surface.

8. In an ice making machine in combination, a rotatable cooling drum having an external freezing surface and an internal chamber for receiving a refrigerating medium, means for delivering liquid to said freezing surface, a revolvable milling cutter co-operable with said freezing surface to remove ice therefrom in the form of dry, thin scale or cuttings, said milling cutter having a cavity, and means for passing said refrigerating medium while in a comparatively warm liquid state through said cavity.

9. In an ice making machine in combination, a cooling drum rotatable about a horizontal axis and having an external freezing surface, means for rotating said drum in one direction, means for cooling said freezing surface, means for delivering liquid to be congealed to said freezing surface at a distance from the uppermost portion thereof, said cooling means being capable of causing a layer of hard dry undercooled ice to be formed on said freezing surface, and a revolvable milling cutter co-operable with said freezing surface to cut ice from said layer in the form of thin chips and angularly spaced more than 300° from said liquid delivering means measured from the latter in the direction of rotation of the drum.

10. In an ice making machine in combination, two co-axial cylindrical drums of different diameters forming therebetween an annular narrow cooling space, a rotatable shaft, hollow spokes at each end of the drums for carrying the same on said shaft and also forming transfer passages leading from each end of said annular cooling space to said shaft, means for circulating a refrigerating medium through said hollow spokes and annular cooling chamber, means for supplying liquid to the outer cylindrical surface of the outermost of said drums, and a revolvable milling cutter co-operable with said outer cylindrical surface to mill off material congealed on the same.

11. The ice making machine of claim 10, in which means for heating said milling cutter are provided for preventing milled off congealed material from clogging said cutter.

AXEL GRUHN.

REFERENCES CITED

The following references are of record in the file of this patent:

UNITED STATES PATENTS

| Number | Name | Date |
|---|---|---|
| 638,577 | Harris | Dec. 5, 1899 |
| 670,247 | Rauch | Mar. 19, 1901 |
| 1,044,972 | Bannister | Nov. 19, 1912 |
| 1,528,043 | Bennett | Mar. 3, 1925 |
| 1,931,347 | Gay | Oct. 17, 1933 |
| 1,963,842 | Gay | June 19, 1934 |
| 2,063,770 | Taylor | Dec. 8, 1936 |
| 2,063,771 | Taylor | Dec. 8, 1936 |
| 2,080,639 | Taylor | May 18, 1937 |
| 2,082,439 | Bazzi | June 1, 1937 |
| 2,104,260 | Kemp | Jan. 5, 1938 |
| 2,141,462 | Doering | Dec. 27, 1938 |
| 2,150,616 | Thilenius | Mar. 14, 1939 |

FOREIGN PATENTS

| Number | Country | Date |
|---|---|---|
| 1,334 | Great Britain | Mar. 25, 1881 |
| 2,763 | Great Britain | Aug. 10, 1874 |
| 14,577 | Great Britain | July 17, 1901 |
| 569,071 | Germany | Jan. 30, 1933 |